(12) United States Patent
Kerdoncuff

(10) Patent No.: US 6,250,112 B1
(45) Date of Patent: Jun. 26, 2001

(54) METHOD OF CONTROLLING AN EXTRUSION OF GLASS TO MAKE AN OPTICAL FIBER

(75) Inventor: Alain Kerdoncuff, Vincennes (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/325,298

(22) Filed: Jun. 3, 1999

(51) Int. Cl.⁷ ................................................. C03B 37/07
(52) U.S. Cl. ................. 65/379; 65/381; 65/382; 65/401; 65/405
(58) Field of Search ............... 65/381, 382, 405, 65/401, 412, 379

(56) References Cited

U.S. PATENT DOCUMENTS

| | | |
|---|---|---|
| 4,217,123 | 8/1980 | Titchmarsh . |
| 4,259,100 | 3/1981 | Aulich . |
| 4,466,818 | 8/1984 | Brongersma . |
| 4,602,926 * | 7/1986 | Harrison .................................. 65/382 |
| 4,897,100 | 1/1990 | Nice ....................................... 65/3.13 |
| 4,978,376 * | 12/1990 | Takahashi ............................... 65/401 |

FOREIGN PATENT DOCUMENTS

| | | | |
|---|---|---|---|
| 067489 | 6/1982 | (EP) . | |
| 082517 | 12/1982 | (EP) . | |
| 2054552 | 6/1980 | (GB) . | |
| 54-68645 * | 6/1979 | (JP) | ...................................... 65/405 |
| 60-34721 * | 8/1985 | (JP) | ...................................... 65/405 |
| 6-51138 * | 2/1994 | (JP) | ...................................... 65/405 |

* cited by examiner

*Primary Examiner*—John Hoffmann
(74) *Attorney, Agent, or Firm*—William Greener; Randall S. Wayland (57) ABSTRACT

A double crucible fiber fabrication system employing a rod to control flow of the core material to produce a core of desired diameter. The rod fits closely within the inner crucible and moves at a speed necessary to produce a core material flow rate which will produce a desired core diameter. Control of the rod speed produces good control of core diameter for a wide variety of different core materials. It is also possible to control the rod speed in order to compensate for capillary effects and leakage of core material. Furthermore, control of the rod speed allows fabrication of a fiber having a core diameter which varies as desired throughout a single fiber.

13 Claims, 7 Drawing Sheets

METHOD OF CONTROLLING AN EXTRUSION OF GLASS TO MAKE AN OPTICAL FIBER

FIELD OF THE INVENTION

The present invention relates generally to improvements relating to optical fiber fabrication. The invention relates more particularly to improved methods and apparatus for control of core material flow in double crucible drawing of optical fibers.

BACKGROUND OF THE INVENTION

A commonly used technique for drawing optical fibers is the double crucible technique, which is used to produce optical fibers from a molten glass couple. The finished optical fiber consists of a core surrounded by a cladding. In fabricating the optical fiber, two different materials are usually required, one for the core and one for the cladding.

The double crucible typically includes two concentric reservoirs. The inner reservoir contains material for the core and the outer reservoir contains material for the cladding. An orifice, or outlet, is drilled at the bottom of each reservoir to allow the molten glass to flow down. The optical fiber geometry is formed when the core material comes into contact with the cladding material at the outlet of the inner reservoir. The size of the optical fiber core is directly proportional to the square root of the volume ratio between the core flow and the cladding flow.

The double crucible technique is useful for the processing of materials which cannot be used in other conventional fabrication techniques such as the chemical vapor deposition (CVD) technique. Complex multi-component glass compositions are good candidates for the double crucible process. These glasses can only be obtained by melting of raw materials at high temperature or sol-gel. Another advantage of the double crucible technique is that it is a one-step process, in which the materials are transformed directly into an optical fiber. Other techniques require multiple steps. An example of this is the preform technique, in which a one-step or two-step process is required to produce a preform consisting of a core material surrounded by cladding, followed by an additional step of drawing the preform into an optical fiber.

As noted, the core size for the double crucible technique is proportional to the square root of the ratio of volume flows between the core and cladding material. Flow rates in the double crucible technique are often controlled by a simple gravity feed. In this case, volume flow is controlled by the design of the inner and outer crucibles, as well as the particular characteristics of the liquids within each of the inner and outer crucibles, including surface tension and viscosity. Flow rate at any particular time in a fabrication run is also influenced by the head pressure of liquid in each of the crucibles. The head pressure changes throughout a run as the level of liquid changes. In addition, it is possible to influence flow rates by adjustment of an outside parameter as discussed further below.

In the case of a gravity feed, molten core and cladding materials are introduced into the inner and outer crucibles, respectively. For a small core size, the ratio of core size to clad size is given by the ratio between the diameters of the inner and outer crucibles. One useful optical fiber has a core size of 4 microns within a cladding size of 125 microns. Such an optical fiber can be fabricated using an inner crucible having a diameter of 1.3 mm and an outer crucible having a diameter of 40 mm. Such a fiber can also be fabricated using other crucible sizes, so long as the ratio between inner and outer crucible diameters is the same. For example, an outer crucible having a diameter of 80 mm could be used with an inner crucible having a diameter of 2.6 mm. A gravity feed using these crucible sizes is effective with many glass compositions. However, for some compositions, particularly those subject to high surface volatilization, a tensile force at the surface of the liquids tends to produce inconsistencies in the core flow. In addition, some compositions are subject to the formation of a thin crust at the surface of the core material. This crust significantly interferes with gravity flow and tends to make gravity flow irregular and unpredictable. For these compositions, therefore, the core size is difficult or impossible to control precisely using the gravity flow method.

In many cases, it is possible to regulate liquid flow in order to control core size by applying an overpressure or underpressure to the inner crucible in order to increase or decrease core flow. This method is particularly useful for changing core to clad ratios without the need to change the ratio between the inner crucible and outer crucible. However, for glass compositions which do not give consistent results using gravity feed due to volatilization, the application of overpressure or underpressure is ineffective. This ineffectiveness results because the tensile force at the surface of the liquids continues to predominate, resulting in inconsistent flows.

Control of flow rates by regulating crucible size also has related costs and results in the inconvenience associated with the need to change crucible sizes in order change flow rates and core sizes.

There exists, therefore, a need in the art for a technique for double crucible drawing of optical fibers which will produce acceptable results for a variety of core materials, including core materials which are subject to tensile forces at the surface of the liquids, and which provides a means for changing flow rate without a need to use different or redesigned crucibles.

SUMMARY OF THE INVENTION

A double crucible apparatus according to the present invention controls core material flow by means of a piston rod moving within the inner crucible to push or retain the core material, If the rod is moved fast enough, the core material will be pushed by the motion of the rod. If the piston is stopped or moved slowly enough, the flow of the core material will be impeded or stopped due to friction between the core materials and the walls of the crucible, and by the impediment presented by the rod. For a single mode fiber, the clad flow rate may suitably be on the order of a few tens of grams per hour, for example, 30 grams per hour, and the core flow for a single mode optical fiber is on the order of three orders of magnitude less, for example, 0.03 grams per hour. The diameter of the inner crucible is only a few millimeters, with the piston being made of a refractory material compatible with the core material and selected to be as close as possible to the diameter of the inner crucible, in order to minimize or avoid any leakage flow. In determining the relative diameters of the rod and the inner crucible, consideration must be given to the fact that the rod and the inner crucible will be used in a high-temperature environment and be subject to expansion. There may be an expansion mismatch between the rod and the inner crucible, and the chosen dimensions must be able to accommodate differential expansion which may occur. It may also be necessary to provide space for air to escape from the inner crucible as the rod is inserted. The rod may be plain, or may be drilled with small holes in order to minimize or avoid any air entrapment in the inner crucible.

For a fixed crucible size and rod size, the core size is a function of the rod speed and the optical fiber speed. The double crucible apparatus according to the present invention includes a rod control mechanism to control the rod speed in order to achieve the proper relation between the rod speed and the optical fiber speed, given the desired core size. The optical fiber speed is not constant during fabrication of an optical fiber. Therefore the rod control mechanism preferably receives information reflecting the optical fiber speed as the optical fiber production proceeds, and employs a computational mechanism to compute the necessary rod speed for the prevailing optical fiber speed. The rod control mechanism further includes a mechanism for moving the rod at the correct speed as determined by the computational mechanism. For lower viscosity cases, leakage flows caused by the insertion of the rod become significant, and the control mechanism preferably adjusts the rod speed in order to reduce or eliminate leakage flows, using parameters experimentally determined for the particular core material composition being used.

A more complete understanding of the present invention, as well as further features and advantages of the invention, will be apparent from the following Detailed Description and the accompanying drawings.

DETAILED DESCRIPTION

Figure 1:
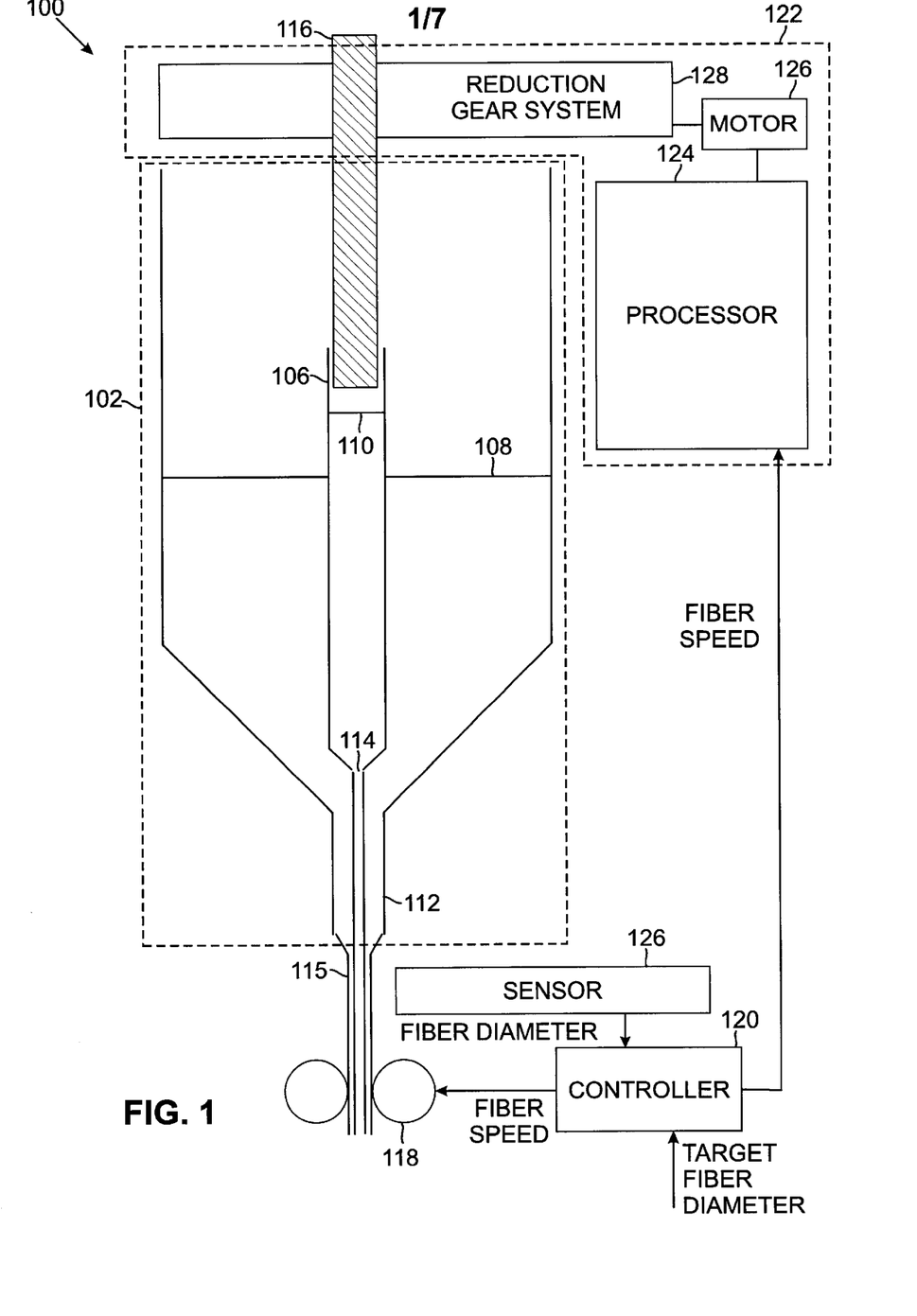
FIG. 1 illustrates a double crucible system employing a rod to control core material flow, according to the present invention.

FIG. 1 illustrates a double crucible optical fiber fabrication system 100 according to the present invention. The system 100 comprises a double crucible 102 including an outer crucible 104 and an inner crucible 106. The outer crucible 104 contains cladding material 108 and the inner crucible 106 contains core material 110. The outer crucible 104 has an outer aperture 112 which forms an outlet to the double crucible 102. The inner crucible 106 has an inner aperture 114. As core material 110 flows out of the inner aperture 114, core and cladding material flow together and then flow out of the outer aperture 112 to produce an optical fiber 115. The inner aperture 114 is positioned very close to the outer aperture 112. This minimizes interdiffusion which occurs between the time the core material 110 and the cladding material 108 flow together, and the time the core material 110 and cladding material 108 flow together out of the outer aperture 112 to form the fiber 115. The diameter of the outer aperture 112 controls the flow rate of core and cladding material out of the double crucible 102, and thus controls the diameter of the fiber 115.

The system 100 includes a piston rod 116 to control flow of the core material 110 in the inner crucible 106. The rod 116 is made of a refractory material compatible with the core material 110. The rod 116 has a diameter which is as close as possible to the diameter of the inner crucible 106. For example, a suitable diameter for the inner crucible 106 may be 3.0 mm, and a rod 116 of 2.8 mm may suitably be used with a crucible of 3.0 mm diameter. This tolerance accommodates expansion mismatches which may occur, as well as the need to allow escape of air. The rod 116 may be solid or it may be drilled with small holes in order to allow air bubbles to escape, thereby reducing or avoiding any air entrapment in the material flowing out of the inner crucible 106.

The flow rate of the cladding material 108 may suitably be in the range of a few tens of grams per hour (g/h), and for a single mode fiber the flow rate of the core material 110 should be about three orders of magnitude less. For example, if the cladding material 108 flows at 30 g/h, the core material 110 should flow at about 0.03 g/h. For different modes, the ratio of the flow rate of the core material 110 to that of the cladding material 108 will be different.

An optical fiber 115 is shown in the process of being fabricated utilizing the system 100. The optical fiber 115 is not shown to scale. As the fiber 115 is extruded from the double crucible 102, it is drawn by the roller pair 118. The roller pair 118 is regulated by a controller 120 which draws the fiber 115 at a speed necessary to maintain the desired diameter of the fiber 115. A typical optical fiber to be drawn with the system 100 has a cladding diameter of 125 microns and a core diameter of 4 microns. A typical drawing speed used in the fabrication of this optical fiber would be in the range of 10–50 m/minute. For the above optical fiber diameter and drawing speed, the speed of the rod 116 should be in the range of 15–45 microns/minute. Although exemplary dimensions are provided herein, it will be recognized that the present invention can be adapted to fabricate optical fibers having different core and cladding diameters.

The speed of the rod 116 can be used to control the core size of the optical fiber 115. Assuming that all the core material 110 pushed by the rod 116 will be fed to the core flow, the core size is given by the following equation:

$$\text{(Rod speed)/(Fiber speed)} = ((\text{Core diameter})/(\text{Rod diameter}))^2.$$

From the above equation, it is seen that the rod speed is a function of the optical fiber pulling speed. The desired rod speed is given by:

$$\text{Rod speed} = ((\text{Core diameter})/(\text{Rod diameter}))^2 * \text{Fiber speed}.$$

Optical fiber speed is not constant during drawing of an optical fiber. Therefore, simply moving the rod at a constant speed will not give satisfactory results. Instead, rod speed must change in accordance with changes in optical fiber speed. In order to achieve this, the motion of the rod is produced by a control mechanism 122 which controls the speed of the rod 116 based on information received concerning the optical fiber speed. The control mechanism 122 may suitably include a processor 124 which controls a motor 126. The motor 126 drives a reduction gear system 128, which translates the rotary motion of the motor 126 into linear motion for driving the rod 116. The reduction gear system 128 preferably has a very high ratio of rotary motion to linear motion, such as 40,000:1, in order to allow for very fine control of linear motion. The processor 124 receives data from the controller 120. The sensor 130 detects the diameter of the fiber 115 and transmits this data to the controller 120. The controller 120 also computes the fiber speed necessary to maintain the collect diameter and operates the roller pair 118 at the correct speed. This control is a closed-loop control, because the fiber diameter is measured by the sensor 130 and the fiber speed controlled in order to achieve the desired fiber diameter. The controller 120 also sends the fiber speed information to the processor 124. The processor 124 employs the fiber speed information to determine the proper speed of the rod 116. The sensor and controller data is monitored and processed either continuously or at very small intervals, in order to allow the rod speed to respond quickly to changes in the optical fiber speed. The control of the speed of the rod 116 is an open-loop control, because the actual core diameter is not measured. Instead, the required rod speed is determined using known parameters in order to achieve the correct core diameter.

Other ways exist of determining optical fiber speed in order to compute the needed rod speed. For example, in many cases it will be possible to determine what the prevailing fiber speed will be throughout fabrication of a fiber, due to knowledge of the flow rate produced by a given outer crucible dimension, and the level of cladding material in the outer crucible. The fiber speed can simply be provided to the processor 120 before beginning of fiber fabrication, and the processor 120 can use the fiber speed at a given time in order to determine the required speed of the rod 116. Furthermore, numerous other possible control mechanisms exist and may be employed consistent with the teachings of the present invention.

Complications are introduced into control of material flow when a core material of low viscosity is used as the core material 108. With a low viscosity core material, leakage flow between the inner crucible wall and the piston surface occurs so that control of flow is impeded. Moreover, a lower viscosity core material is subject to capillary effects. Capillary effects tend to cause the core material to creep along the surface of the inner crucible walls as a result of surface tension of the core material. These effects are exhibited when the viscosity of the core material is 100 poises or less.

Leakage and capillary effects arise because the immersion of the rod 116 into the core material 110 gives rise to two different flows. The displacement of the core material 110 by the rod 110 causes a downward flow ($Q_{rod}$). At the same time, an upward flow ($Q_{leakage}$) is created between the rod 116 and the wall of the inner crucible 106. The amount of leakage flow is a function of four parameters: (1) the distance between the rod and the inner crucible wall, (2) the length of the rod inserted into the core material, (3) the surface tension of the core material, and (4) the core material viscosity. The net flow ($Q_{core}$) of the core material 110 out of the inner crucible 106 can be expressed as:

$$Q_{core}=Q_{rod}-Q_{leakage}.$$

For a sufficiently high viscosity core material 110 and a sufficiently small gap between the rod 116 and the wall of the inner crucible 106, $Q_{leakage}$ is approximately 0. In that case, there is no need for compensation in order to overcome leakage, and the formula above may be used to determine the speed of the rod 116. However, with lower viscosities, $Q_{leakage}$ is greater, and therefore $Q_{core}$ may be unacceptably reduced. In order to overcome this problem, the formula given above is adapted with the use of three additional parameters. These factors are:

α: overcompensation factor;

τ: relaxation factor. This is the time during which overcompensation is effective;

$t_0$: time at which operation of the rod begins.

The factors α and τ are determined experimentally for the particular core material composition being used.

When it is required to compensate in order to reduce $Q_{leakage}$, the processor 124 employs the following formula to compute the required rod speed:

Rod speed=Fiber speed*((Core diameter*)/Rod diameter)$^2$ where

Core diameter*=Core diameter+Core diameter(α−1)$e^{-(t-t_0)/\tau}$.

This formula does not give a constant degree of overcompensation. This is because the length of rod immersed into the core material 110 increases over time, and as a result the leakage flow $Q_{leakage}$ decreases over time. At the beginning of a fabrication run, the core diameter setting is equal to (α*core diameter target), and then the core diameter setting decreases exponentially toward the core diameter target at a rate determined by the factor τ. As noted above, the two factors α. and τ are determined experimentally for each composition of core material 110.

The system 100 according to the present invention produces numerous advantages in achieving a desired core size and controlling core flow. In glass compositions in which a crust tends to form, the rod 116 physically breaks up the crust, removing the obstacle to free flow presented by the crust. In addition, it is possible to vary the rod speed during fabrication of an optical fiber in order to produce a single fiber with varying core sizes. The processor 120 can simply be set to adjust the rod speed at appropriate times in order to achieve the various core sizes desired. This cannot be done with a simple gravity feed, as it is impossible to change crucibles during fabrication of a single optical fiber.

Furthermore, a system such as the system 100 is more convenient to use than a system using pressure settings to control core flow. One reason for this improved convenience is that pressure settings have different effects on core materials having different viscosities and chemistries. In order to use a material having a different viscosity, a system using pressure settings would have to be adjusted in order to produce the proper flow rate for the given viscosity. A system such as the system 100 is not subject to this limitation. Except at low viscosities, the use of a rod at a particular speed produces the same flow rate no matter what viscosity of core material is used. Therefore, in most cases no adjustment is needed to adapt the system to the use of a different viscosity, so long as the same fiber diameter and core size are desired.

Figure 2:
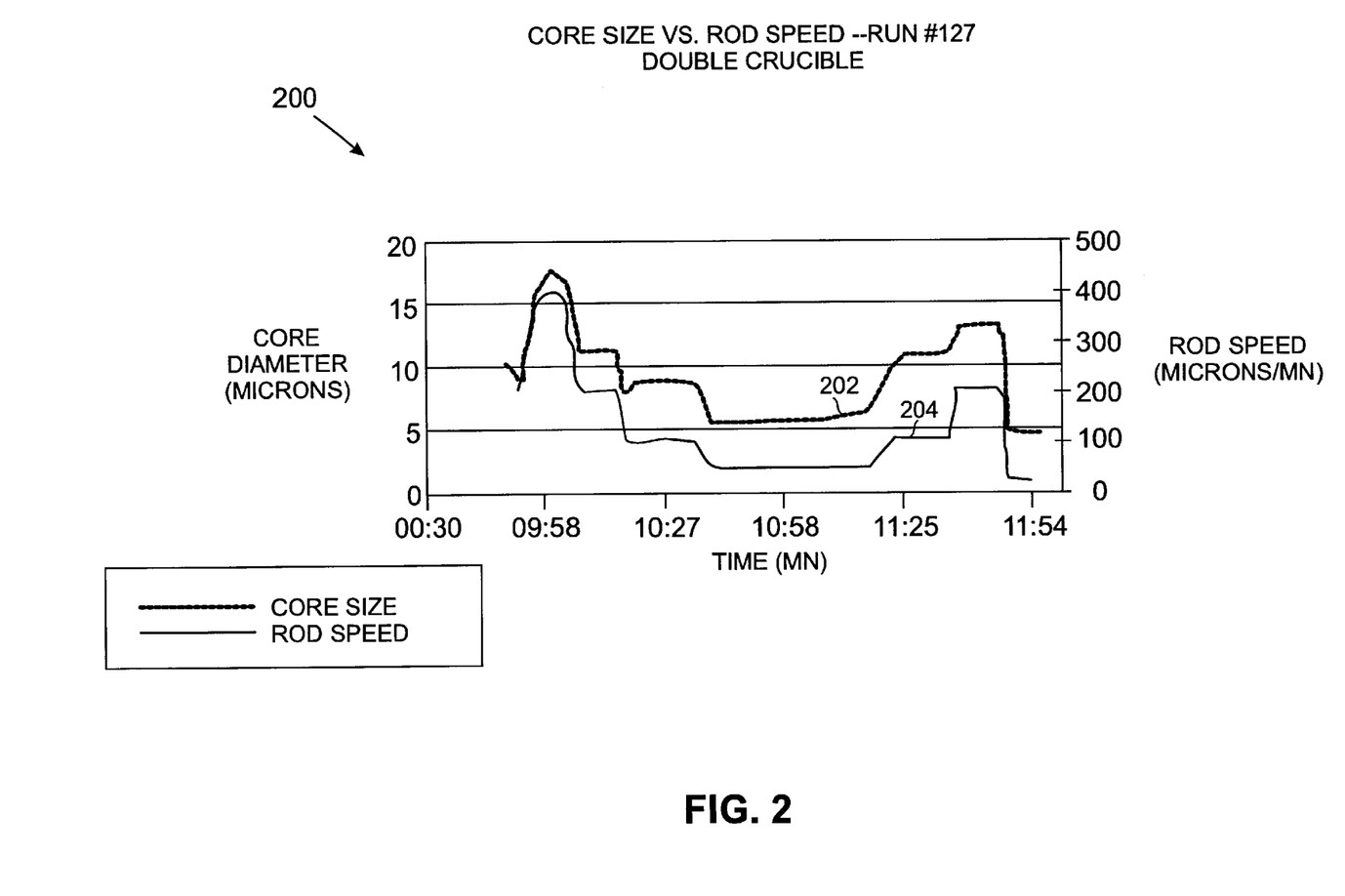
FIG. 2 is a graph showing the relationship between core size and rod speed produced by a system according to the present invention.

FIG. 2 is a graph 200 of experimental results illustrating control of core size by rod speed for a 125 micron diameter optical fiber. The core size can be controlled in a wide range from a few microns to 15–20 microns. The first curve 202 illustrates rod speed over time for an exemplary optical fiber fabrication run which in the present example took place over the period between 0930 and 1200, and the second curve 204 illustrates core size over time for the same fiber fabrication run. It can easily be seen that the second curve 204 follows the first curve 202, illustrating the closeness of the relationship between rod speed and core size.

The use of the rod to control flow rates, rather than leaving flow rates to gravity or pressure manipulations, allows fabrication of a single mode optical fiber from different glass couples, having a different index mismatch, using the same crucible design. The control is independent of the glass temperature and the glass viscosity, which makes the process very robust against any perturbations or composition changes.

Figure 3:
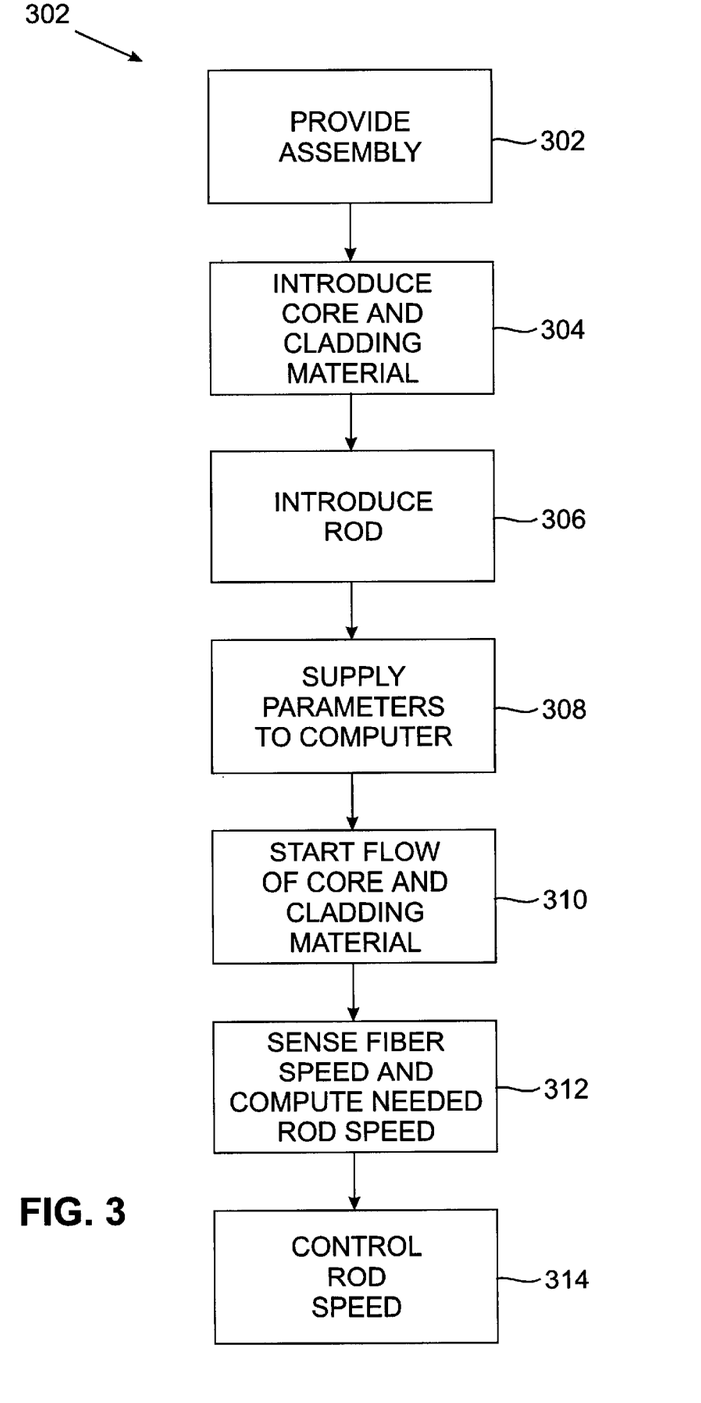
FIG. 3 illustrates the steps of a method of double crucible optical fiber fabrication employing a rod to control core material flow, according to the present invention.

FIG. 3 illustrates the steps of a method 300 for optical fiber fabrication according to the present invention. At step 302, a double crucible assembly is provided similar to the assembly shown in FIG. 1, including an inner crucible, an outer crucible, and a rod whose motion is controlled by a processor and a reduction assembly. The inner crucible and the outer crucible each have an aperture with a dimension designed to allow for the desired flow rate to produce the core or cladding diameter desired. Additional factors influence the flow rate and therefore the diameter, including rod speed and fiber drawing rate. Upon exiting from the double crucible, the fiber is drawn between rollers whose speed is regulated to produce the desired fiber diameter.

The processor receives information from a sensor adapted to detect motion of an optical fiber produced by the assembly and to relay information about the fiber speed to the processor. The processor is adapted to perform computations to produce a required rod speed based on information provided by the sensor, and predetermined information about the core size desired, and additional presupplied parameters relating to the fabrication process, such as crucible sizes and core material viscosity.

The outer crucible has an outer aperture with a dimension designed to produce a fiber speed needed to produce a given fiber diameter. The chosen fiber diameter may suitably be 125 microns, which is standard for telecommunications fibers. The fiber diameter is the cladding diameter, and the cladding diameter is determined by the flow rate of the cladding material. The flow rate of the cladding material is suitably determined by gravity, and the outer aperture dimension is therefore chosen to produce the desired flow rate. The dimension of the inner crucible is chosen to allow flow rates which will produce the range of core diameters which may be desired. The same inner crucible may be used to produce various core sizes through the regulation of core flow rates by the rod also included in the assembly. The motion of the rod controls flow of the core material by pushing or retaining core material within the inner crucible. The rod is as close as possible in diameter to the diameter of the inner crucible, considering constraints which must be met, such as expansion mismatch and the need to allow air to escape. A controller is provided for the accurate control of the rod speed, as well as a sensor for sensing the fiber speed in order to regulate the rod speed based on the fiber speed.

At step 304, core material is introduced into the inner crucible and cladding material is introduced into the outer crucible. The core material and the cladding material are melted within the crucibles. At step 306, the rod is introduced into the inner crucible.

At step 308, parameters are supplied to the processor to allow the processor to compute the rod speed required to produce the core size desired. These include information concerning the rod diameter and the viscosity of the core material. If compensation is needed to overcome leakage or capillary effects, the parameters α and τ are also supplied and the formula Rod speed=Fiber speed*((Core diameter* )/Rod diameter)$^2$ is used.

At step 310, flow of the core material and the cladding material is started. At step 312, the fiber speed is sensed and relayed to the processor, and the processor uses the fiber speed and other parameters to determine the rod speed needed to produce a core of desired diameter. At step 314, the processor controls the speed of the motor driving the gear reduction assembly to produce the rod speed for the required core size. Steps 312 and 314 are repeated at short intervals until the fiber fabrication is complete.

Figure 4:
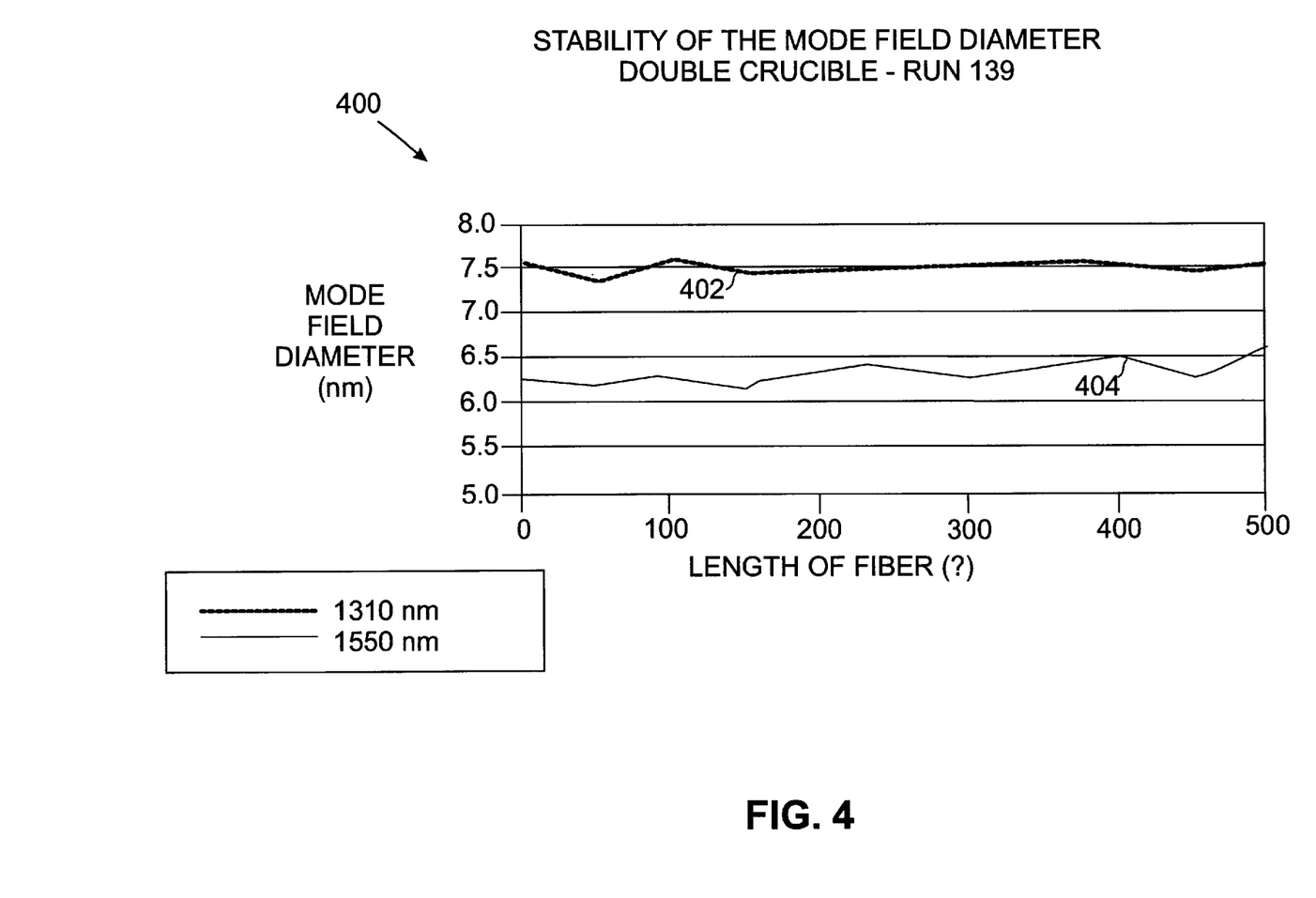
FIG. 4 is a graph of mode field diameter versus length throughout a production run for exemplary optical fibers produced by a system according to the present invention.

FIG. 4 is a graph 400 showing the mode field diameter for a fiber produced by an optical fiber fabrication system according to the present invention, such as the system 100. The mode field diameter is the diameter of a light beam traveling into the core. It is larger than the core diameter, as a portion of the light beam travels within the cladding. The curve 402 shows the mode field diameter versus fiber length for a light wavelength of 1310 nm. The curve 404 shows the mode field diameter versus fiber length for a light wavelength of 1550 nm. It can be seen in both cases that the mode field diameter exhibits very little variation throughout the length of the fiber.

Figure 5:
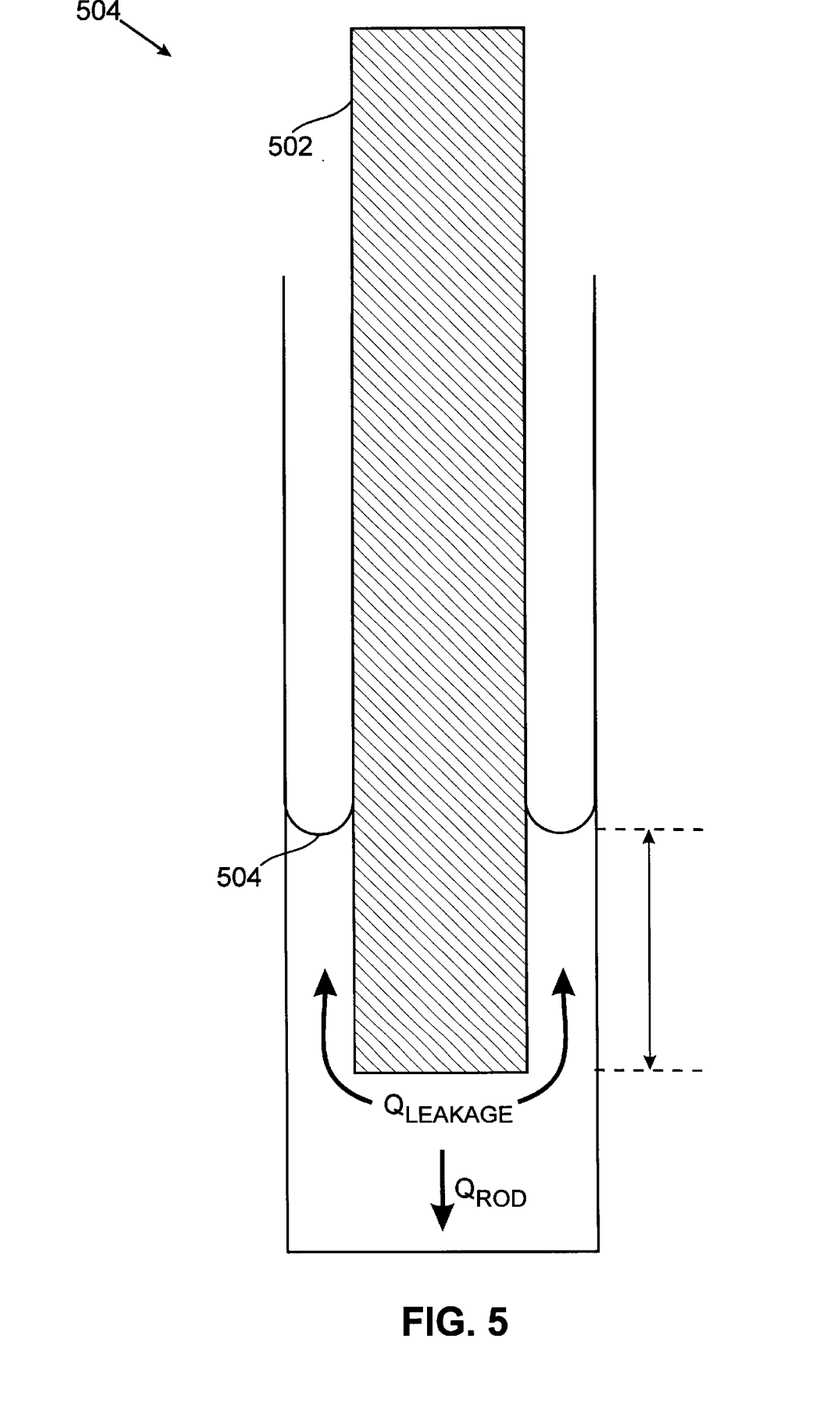
FIG. 5 shows a crucible having a rod inserted into a core material, in order to illustrate flows induced by insertion of the rod.

FIG. 5 illustrates flows created by insertion of a rod into a crucible containing core material. A crucible 500 is shown, having a rod 502 inserted into a core material 504. The rod 502 is inserted to a depth L, and the arrows illustrate the piston flow and leakage flow induced by the rod 504.

Figure 6:
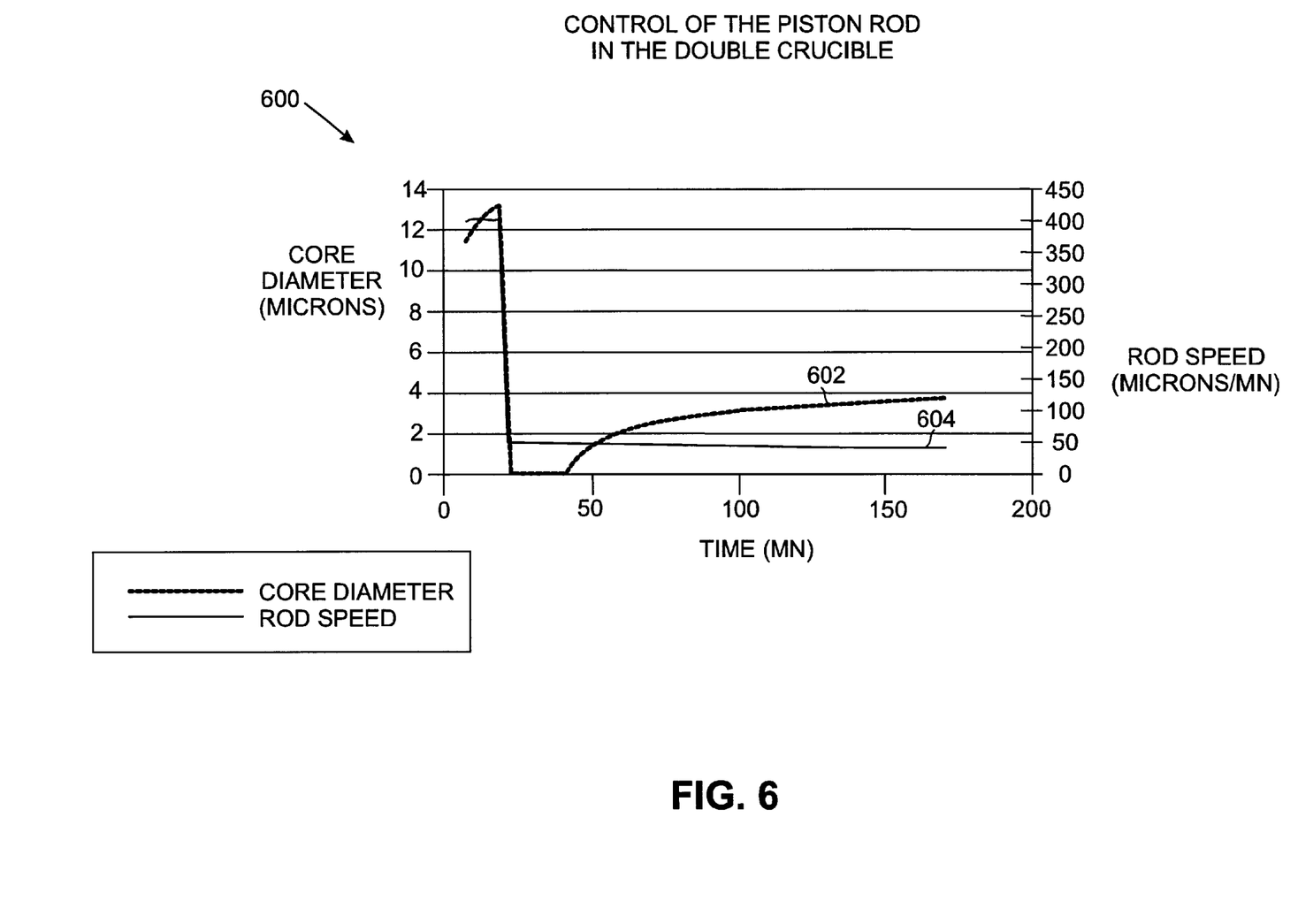
FIG. 6 is a graph showing core diameter over time and rod speed over time, where the rod speed is controlled without compensating for leakage flows.

FIG. 6 is a graph 600 illustrating core diameter and rod speed over time, for a low viscosity case. The rod speed is controlled without compensation for the low viscosity case. Core diameter over time is illustrated by the curve 602 and rod speed over time is illustrated by the curve 604. It can be seen that the core diameter varies significantly over time.

Figure 7:
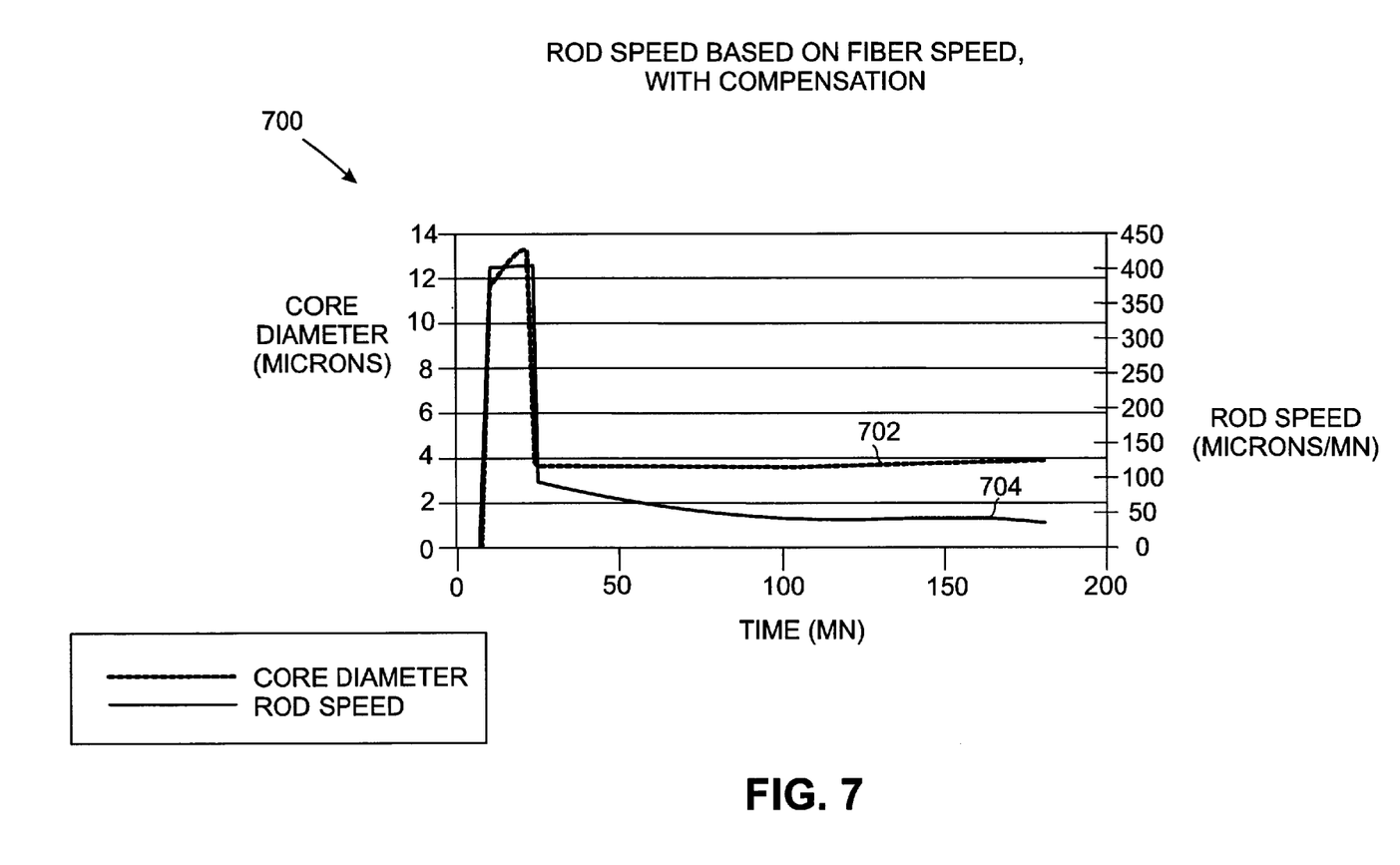
FIG. 7 is a graph showing core diameter over time and rod speed over time, where the control of the rod speed includes compensation in order to reduce or eliminate leakage flows.

FIG. 7 is a graph 700 illustrating core diameter and rod speed over time, again for a low viscosity case. In this case, however, rod speed is controlled with compensation being made. Core diameter over time is illustrated by the curve 702 and rod speed over time is illustrated by the curve 704. It can be seen that the rod speed decreases gradually over time, and that the core diameter is thereby held very nearly constant, illustrating the advantage of compensation in the low viscosity case.

While the present invention is disclosed in the context of various presently preferred embodiments, it will be recognized that a wide variety of implementations may be employed by persons of ordinary skill in the art consistent with the above discussion and the claims which follow below.

We claim:

1. A method of double crucible fiber fabrication of an optical fiber comprising a core surrounded by a cladding, comprising the steps of:

inducing a flow of a core material and a cladding material so that the core material and the cladding material flow together from an inner crucible and outer crucible to form the fiber; and controlling a flow rate of the core material by application of mechanical pressure to the core material in order to produce a desired core diameter, the mechanical pressure is derived by inserting a close-fitting piston into the inner crucible.

2. The method of claim 1 wherein the step of controlling the flow rate of the core material includes determining a fiber speed of the fiber and using the fiber speed in computations to determine the necessary flow rate to produce the desired core diameter.

3. A method of double crucible fiber fabrication of an optical fiber comprising a core surrounded by a cladding, comprising the steps of:

inducing a flow of a core material and a cladding material so that the core material and the cladding material flow together to form the fiber; and controlling a flow rate of the core material by application of mechanical pressure to the core material in order to produce a desired core diameter wherein the application of mechanical pressure to the core material is achieved by movement of a mechanical object against the core material.

4. The method of claim 3 wherein the step of controlling the flow rate of the core material includes adjusting the flow rate in order to change the core diameter during fiber fabrication.

5. The method of claim 4 wherein determining the fiber speed includes sensing the fiber diameter and computing a fiber speed based on the fiber diameter.

6. The method of claim 3 wherein the computations to determine the necessary flow rate include computations to determine compensation needed to overcome capillary effects and leakage of the core material.

7. The method of claim 6 wherein compensation to overcome capillary effects and leakage of the core material includes parameters determined experimentally for a particular composition of the core material.

8. The method of claim 7 wherein the rod speed is determined by the formula

Rod speed=Fiber speed*((Core diameter*)/Rod diameter)$^2$, where Core diameter=Core diameter+Core diameter $(\alpha-1)e^{-(t-t_0)/\tau}$, where $\alpha$ is an overcompensation factor, $\tau$ is a relaxation factor indicating a time during which overcompensation is effective, and $t_0$ is the time at which operation of the rod begins, and wherein $\alpha$ and $\tau$ have been experimentally predetermined for a particular core material composition.

9. A method of double crucible fiber fabrication of an optical fiber comprising a core surrounded by a cladding, comprising the steps of:

providing a double crucible comprising an inner crucible and an outer crucible;

placing core material in the inner crucible;

placing cladding material in the outer crucible;

inducing the core material and cladding material to flow to form the fiber; and placing a piston in the inner crucible and moving the piston to apply pressure to the core material and thereby regulate flow of the core material to achieve a desired core diameter.

10. A method of double crucible fiber fabrication of an optical fiber comprising a core surrounded by a cladding, comprising the steps of:

providing a double crucible comprising an inner crucible and an outer crucible;

placing core material in the inner crucible;

placing cladding material in the outer crucible;

inducing the core material and cladding material to flow to form the fiber; and placing a rod in the inner crucible and moving the rod to regulate flow of the core material to achieve a desired core diameter wherein movement of the rod is regulated by a processor which receives fiber speed information and computes a rod speed needed to achieve the desired diameter for the fiber speed information received.

11. The method of claim 10 wherein the fiber speed information is furnished by a controller which determines the fiber speed based on fiber diameter information received from a sensor operative to determine the fiber diameter.

12. The method of claim 11 wherein the processor controls a motor, the motor driving a reduction gear system to produce the computed rod speed.

13. The method of claim 12 wherein the rod speed is given by the formula

Rod speed=(Core diameter/Rod diameter)$^2$*Fiber speed.

* * * * *

UNITED STATES PATENT AND TRADEMARK OFFICE
CERTIFICATE OF CORRECTION

PATENT NO.    : 6,250,112 B1
DATED         : June 26, 2001
INVENTOR(S)   : Alain Kerdoncuff It is certified that error appears in the above-identified patent and that said Letters Patent is hereby corrected as shown below:

<u>Column 9,</u>
Line 25, please insert an -- * -- after the first occurrence of the word "diameter" and before the "=" sign.

Signed and Sealed this

Ninth Day of April, 2002

Attest:

JAMES E. ROGAN
*Attesting Officer*            *Director of the United States Patent and Trademark Office*